2,950,295

SUBSTITUTED BENZENESULFONYL-HYDRAZONES (K)

Hans Willi Zimmer, Cincinnati, Ohio, assignor to The Chattanooga Medicine Company, Chattanooga, Tenn., a corporation of Tennessee No Drawing. Filed July 1, 1958, Ser. No. 745,832

3 Claims. (Cl. 260—397.7)

The instant invention relates to novel organic compounds, and more particularly, to novel substituted benzenesulfonylhydrazones.

Although the compounds of the invention may have a number of uses in various fields, they may be found to be particularly useful as sun screen agents, foaming agents and chemotherapeutic agents. A desirable ingredient for "sun tan" lotions is a sun screen agent with high absorption of ultraviolet radiation in the neighborhood of 2970 A. (which wavelength produces undesirable reddening effect on the skin) and low absorption of light radiation in the neighborhood of 3400 A. (which wavelength produces the maximum tanning effect). The instant compounds possess such absorption spectral characteristics.

Also, the instant compounds may undergo decomposition upon melting and such decomposition is accompanied by the evolution of a large volume of gas, so that these compounds may be added to molten plastic or synthetic resin materials to act as foaming agents therefor.

In addition, the compounds of the invention may display anti-bacterial activity comparable to that of the well known sulfa drugs, sulfanilamide and sulfadiazine. In this respect, it should be noted that certain bacteria such as *Streptococcus pyogenes*, *Micrococcus pyogenes*, and *Escherichia coli* tend to become resistant to the known sulfa drugs, although they may be particularly sensitive to a new sulfa compound. It is believed that exposure of such bacteria to known sulfa drugs often tends to result in the survival of a strain resistant to such sulfa drugs, but still sensitive to a new sulfa drug to which the strain has not yet been exposed. There is thus a great need for new compounds which display anti-bacterial activity.

It is, therefore, an important object of the instant invention to provide new and useful substituted benzenesulfonylhydrazones.

It is another object of the instant invention to provide new and useful β-nitrobenzenesulfonylhydrazones of aldehydes and ketones containing a benzene nucleus having a nitro substituent and a hydroxy or alkoxy substituent thereon.

Yet another object of the instant invention is to provide new compounds useful as sun screen agents, foaming agents and/or chemotherapeutic agents.

Other and further objects, features and advantages of the present invention will become apparent to those skilled in the art from the following detailed disclosure thereof.

The instant invention consists in a compound having the following formula:

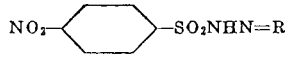

wherein R is an aromatic radical containing at least one benzene nucleus with at least one —NO₂ group and at least one —OX group attached to the nucleus, X being selected from the class consisting of H or a $C_1$–$C_4$ alkyl group.

As indicated, the instant compounds are p-nitrobenzenesulfonylhydrazones of certain aromatic aldehydes and ketones.

In each case, these are aldehydes or ketones containing at least one benzene nucleus having at least one nuclear substituent that is a hydroxy or a $C_1$–$C_4$ alkoxy group and at least one nuclear substituent that is the nitro group. It is important that both the nitro and the hydroxy or alkoxy group be substituents on a single benzene nucleus. Such benzene nucleus may contain, in addition to the nitro group and the hydroxy or alkoxy group, such other groups as $C_1$–$C_4$ alkyl or additional nitro, hydroxy or alkoxy groups. Preferably, the benzene nucleus contains a total of not more than three nuclear substituents.

Expressed in other terms, the compound of the invention may have the formula:

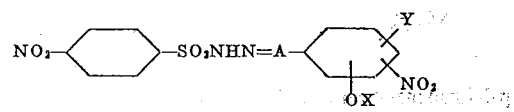

wherein A is a trivalent $C_1$–$C_6$ aliphatic hydrocarbon group, Y is OX, NO₂ or X, and X is H or a $C_1$–$C_4$ alkyl group. A is a trivalent group such as:

=CH—, =C—, =CHCH₂—, =C—CH₂—
         |              |
         CH₃            CH₃

=CHCH=CH— (as in cinnamaldehyde derivatives)

=C—CH=CH— (as in benzalacetone derivatives)
 |
 CH₃

=C—CH₂CH₂— (as in benzylacetone derivatives)
 |
 CH₃

=C—CH₂— (as in butyl benzyl ketone derivatives)
 |
 C₄H₉

Typical compounds of the invention include:

p-Nitrobenzenesulfonylhydrazone of 5-nitrosalicylaldehyde:

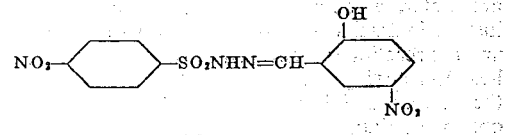

p-Nitrobenzenesulfonylhydrazone of 6-nitroveratraldehyde:

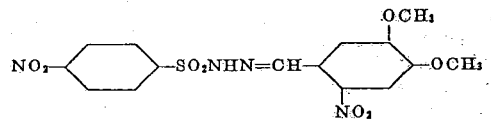

p-Nitrobenzenesulfonylhydrazone of 2-hydroxy-3-nitro-5-methyl acetophenone:

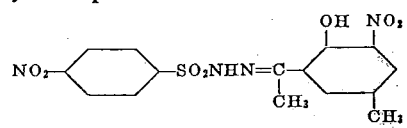

p-Nitrobenzenesulfonylhydrazone of 6-nitrovanillin:

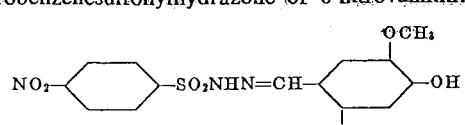

p-Nitrobenzenesulfonylhydrazone of 2-hydroxy-5-nitro-cinnamaldehyde:

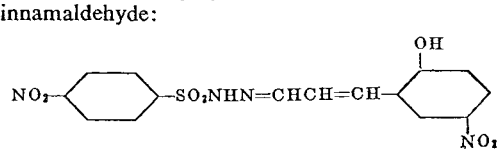

p-Nitrobenzenesulfonylhydrazone of butyl-(2-hydroxy-5-nitrobenzyl)-ketone:

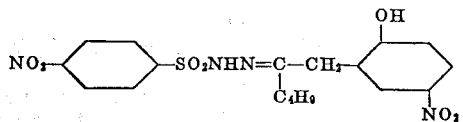

p-Nitrobenzenesulfonylhydrazone of 2,4-dihydroxy-5-nitrobenzaldehyde:

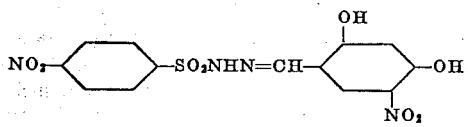

p-Nitrobenzenesulfonylhydrazone of 3,5-dinitroanisaldehyde:

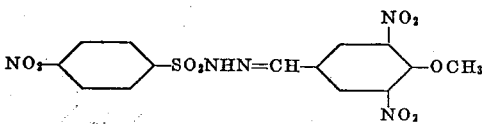

p-Nitrobenzenesulfonylhydrazone of 2-hydroxy-5-nitrobenzylacetone:

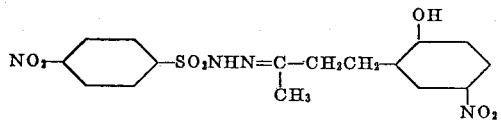

p-Nitrobenzenesulfonylhydrazone of 2-hydroxy-5-nitrobenzalacetone:

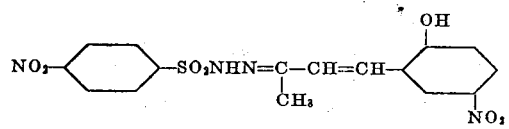

The compounds of the instant invention are prepared by reacting the aldehyde or ketone with p-nitrobenzenesulfonylhydrazine. The reaction is carried out advantageously in a solvent; and the solvents preferred for use are water, alcohol, dioxane or mixtures thereof. The instant hydrazine is relatively insoluble in the solvents; and the reaction is facilitated by the application of external heat and stirring. The selected hydrazine is first placed in the solvent and heat is applied with stirring, so as to obtain a solution or slurry; then substantially an equal molecular quantity of the aldehyde or ketone is added, preferably a small amount at a time with stirring, until the reaction is completed, as evidenced by a homogeneous appearance of the reaction mixture. The entire reaction period is only 5 to 10 minutes ordinarily. The product separates from the reaction mixture on cooling to room temperature and may be easily separated therefrom; the crude product may be recrystallized from water, alcohol, dioxane or a mixture thereof to yield a relatively pure product.

Example 1 p-Nitrobenzenesulfonylhydrazine (0.025 mol) is added with stirring to a mixture of 500 ml. of warm methanol and 500 ml. of warm water. A charge of 5-nitrosalicylaldehyde (0.025 mol.) is then added slowly, with vigorous stirring; and after the mixture becomes homogeneous the reaction mixture is allowed to cool and stand overnight.

The material then separated is collected on a suction filter and dried in an oven at 95° C. The resulting material is then recrystallized from 100 ml. of hot methanol to obtain a yellow semi-amorphous material melting at 200–201° C. with decomposition. Analysis for p-nitrobenzenesulfonylhydrazone of 5-nitrosalicylaldehyde: calculated for $C_{13}H_{10}N_4O_7S$ is C=42.62, H=2.75; and found, C=42.83, H=2.60.

The corresponding hydrazones of other aldehydes may be prepared by carrying out the foregoing procedure using, instead of 5-nitrosalicylaldehyde, such other aldehydes as 2-hydroxy-3-nitro-5-methyl acetophenone, 6-nitrovanillin, 2-hydroxy-5-nitrocinnamaldehyde, 2-hydroxy-5-nitrobenzylacetone, and the like.

Example 2

A procedure is carried out that is the same as that described in Example 1, except that 6-nitroveratraldehyde is used in place of the 5-nitrosalicylaldehyde and the resulting product is a yellow amorphous material melting with decomposition at 184.5–185° C. Analysis for p-nitrobenzenesulfonylhydrazone of 6-nitroveratraldehyde: calculated for $C_{15}H_{14}N_4O_8S$ is C=43.09, H=3.44; and found, C=44.13, H=3.67.

The compounds of the invention just described show peak absorptions of light radiation in the neighborhood of 2970 A. and low absorption of light radiation in the neighborhood of 3400 A., so that they may be used in sun tan lotions. These compounds also undergo decomposition upon melting; and, with respect to anti-bacterial activity, it will be noted that p-nitrobenzenesulfonylhydrazone of 5-nitrosalicylaldehyde is effective with respect to *Streptococcus pyogenes* and is particularly effective with respect to *Micrococcus pyogenes*.

It will be understood that modifications and variations may be effected without departing from the spirit and scope of the novel concepts of the present invention.

I claim as my invention:

1. A compound having the following formula:

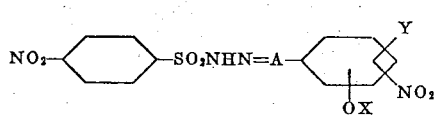

wherein A is a trivalent aliphatic hydrocarbon group having from one to six carbon atoms, any unsaturation in A being in the form of a single olefinic group, Y is selected from the class consisting of —OX, —NO₂ and —X, and X is selected from the group consisting of H and an alkyl group having from one to four carbon atoms.

2. p-Nitrobenzenesulfonylhydrazone of 5-nitrosalicylaldehyde.

3. p-Nitrobenzenesulfonylhydrazone of 6-nitroveratraldehyde.

References Cited in the file of this patent

Chemical Abstracts, vol. 41, pp. 5475–5477 (1941). [Abstract of Lehmann et al., Bull. Soc. Chim. Belges, vol. 55, pp. 52–97 (1946).]

Curtius et al.: J. Prakt. Chem., vol. 112, pp. 118–119; 127; 132 (1926).

Lehmann et al.: Bull. Soc. Chim., Belges, vol. 55, pp. 66–68; 82–85; 89–92 and 94–96 (1946).